United States Patent
Eisen et al.

(10) Patent No.: US 8,510,726 B2
(45) Date of Patent: Aug. 13, 2013

(54) SYSTEM AND METHOD FOR GENERATING WHITE-BOX IMPLEMENTATIONS OF SOFTWARE APPLICATIONS

(75) Inventors: Philip Allan Eisen, Ottawa (CA); Grant Stewart Goodes, Manotick (CA); Daniel Elie Murdock, Ottawa (CA)

(73) Assignee: Irdeto Canada Corporation, Kanata, ON (CA)

( * ) Notice: Subject to any disclaimer, the term of this patent is extended or adjusted under 35 U.S.C. 154(b) by 442 days.

(21) Appl. No.: 12/992,318

(22) PCT Filed: May 25, 2009

(86) PCT No.: PCT/CA2009/000755
§ 371 (c)(1),
(2), (4) Date: Nov. 12, 2010

(87) PCT Pub. No.: WO2009/140774
PCT Pub. Date: Nov. 26, 2009

(65) Prior Publication Data
US 2011/0067012 A1    Mar. 17, 2011

Related U.S. Application Data (60) Provisional application No. 61/055,694, filed on May 23, 2008.

(51) Int. Cl.
*G06F 9/44*    (2006.01)
(52) U.S. Cl.
USPC .......................................... 717/162
(58) Field of Classification Search
USPC ............. 717/136, 162; 713/150, 176, 182, 713/186, 193, 194; 380/28, 44, 277; 715/762
See application file for complete search history.

(56) References Cited

U.S. PATENT DOCUMENTS

| | | | |
|---|---|---|---|
| 2004/0139340 A1 | 7/2004 | Johnson et al. | |
| 2005/0021966 A1* | 1/2005 | Chow et al. | 713/176 |
| 2006/0140401 A1* | 6/2006 | Johnson et al. | 380/44 |
| 2007/0086586 A1* | 4/2007 | Jakubowski et al. | 380/28 |
| 2009/0252327 A1* | 10/2009 | Ciet et al. | 380/277 |
| 2010/0299515 A1* | 11/2010 | Michiels et al. | 713/150 |

FOREIGN PATENT DOCUMENTS

| | | |
|---|---|---|
| WO | 2008059420 A2 | 5/2008 |
| WO | 2009034504 A2 | 3/2009 |

OTHER PUBLICATIONS

Thompson et al, "Cryptoprogramming: A Software Tamper Resistant Mechanism Using Runtime Pathway Mappings" (2004) p. 1-12 <CryptoProgrrm04.pdf>.*

* cited by examiner

*Primary Examiner* — Tuan A Vu

(57) ABSTRACT

A development suite for generating files, such as DRM-protected files, using white-box cryptography. The suite consists of a code generation tool, a data transformation engine, and a white-box data generation tool, and a white-box library. In the white-box cryptography context, the data transformation engine is used to protect the boundary between the cryptographic operation and the surrounding code. In particular, the data transformation engine is used to apply data transformations to the inputs to and outputs from the cryptographic operations. If the user specifies that transformations are required via a white-box parameterization file, the code generation tool puts the information specified by the user into a form the data transformation engine understands, namely as qualifiers on data variables and function prototypes. The data transformation engine then applies the specified transformations, and passes information to the data generation tool regarding which transformations were chosen.

16 Claims, 6 Drawing Sheets

SYSTEM AND METHOD FOR GENERATING WHITE-BOX IMPLEMENTATIONS OF SOFTWARE APPLICATIONS

CROSS REFERENCE TO RELATED APPLICATIONS

This application is a National Entry of PCT/CA2009/000755, filed May 25, 2009, which claims the benefit of U.S. Provisional Application No. 61/055,694, filed May 23, 2008, the contents of which are incorporated herein by reference in their entirety.

FIELD OF THE INVENTION

The present invention relates generally to cryptography. More particularly, the present invention relates to the development of software applications designed to operate securely in an environment where an attacker has full access to and control over the executing software.

BACKGROUND

White-box cryptographic software is software which performs cryptographic functions in a white-box attack context; that is, in an environment in which at least portions of a software application, and potentially the entire implementation, is potentially exposed to an attacker who has at least some degree of control, and possibly complete control, of the platform on which the software is running.

Such a context arises, for example, in connection with cryptographic applications such as digital rights management (DRM), where television programs, movies, music, and the like, are shown on a personal computer (PC) or other similar commodity computational device, rather than on a conventional television via broadcast or via a DVD player. While many owners of such commodity devices will respect copyright laws, there are others who will attempt to make a profit on media directed to PCs or similar devices by stealing the content without paying its owners for their use by making and selling illicit copies of the media content. PCs are a particularly exposed environment: a knowledgeable attacker can gain complete control of the device and can watch the software running in detail and control, halt, or modify its execution using a debugger, and can repeatedly execute the same code looking for patterns of behavior which can be exploited, and the like.

White-box cryptographic software is designed to run in such a context. A cryptographic function targeted to the white-box attack context, while it may well implement a conventional cipher, implements it in profoundly unconventional ways, in order to impede the understanding of the attacker of the way in which the software operates. For example, typically, the keys are either embedded in the remainder of the white-box cryptographic software by partial evaluation, or they are encoded. Moreover, the input and output texts of the cipher are typically encoded to make the attacker's knowledge of conventional implementations of the cipher much less useful in mounting an attack on a white-box cryptographic implementation.

In the past, a user would be required to determine and specify security parameters which would be incorporated within user defined software which also includes API calls used to access white box library tools. In other words, in the past white-box cryptographic operations have been injected into software applications by including constructed white-box implementations into the software and then optionally securing their interface data (e.g., for an encryption, this typically comprises the key and plaintext inputs and the ciphertext output) using an obfuscating and/or tamper-proofing tool, such as the Cloakware Transcoder™. The responsibility for correctly connecting together the software employing the cryptographic functionality and the software implementing it, the key (or keys, in the case of public key cryptography), the text input, and the text output, lies with the programmer using the cryptographic functionality (the programmer/user).

Because every step is under the control of the programmer/user, it has all of the problems that come from expecting perfect performance from human beings. When the programmer/user succeeds, the result is that the functionality is as intended. If the programmer/user misses a step, or performs a step incorrectly, the functionality may differ in gross or subtle ways from what is intended. The latter is far more dangerous: gross errors are usually caught in testing; subtle errors can easily be missed.

It is evident, therefore, that, while the advent of white-box cryptographic implementations, has made DRM content distribution systems more viable, nevertheless, a large problem remains with what we might call the peri-cryptic (where unenciphered text enters or leaves the white-box implementation) and inter-cryptic (where enciphered text moves from one form of encipherment to another) aspects of the implementation. We have determined that as well as the white-box ciphers or cryptographic hashes themselves, there is a need to improve the construction of the software in which the white-box ciphers or cryptographic hashes reside, and of the construction of connections among different cryptographic components where a system employs multiple encryptions and hashes which form the 'plumbing' of the information pipes along which enciphered or hashed content travels, where the peri-cryptic and inter-cryptic parts of the software formerly had to be hand-constructed in detail by a knowledgeable user.

SUMMARY

There is provided a computer-implemented method of generating a protected software application using white-box cryptography, and a computer program product embodying the method. The method comprises receiving at least one input source file including application source code and abstracted white-box function calls; and receiving a parameterization file containing cryptographic domain parameters for each abstracted white-box function call. White-box call definition data is then generated defining each abstracted white-box function call in accordance with its cryptographic domain parameters. At least one data transformation, such as a block or asymmetric cipher, is then applied to the input source file and the white-box call definition data to respectively generate a transformed source file and transformed white-box call definition data. Data initializations, containing instance-specific data for each white-box function call in accordance with the white-box call definition data and the transformed white-box call definition data, are then generated. The transformed source file, the transformed white-box definition data and the data initialization code are then compiled, and the resulting compiled code is linked to a white-box library to provide an executable software application. The white-box call definition data generates code, in an automated manner, connecting white-box implementation Application Procedural Interfaces (APIs) to the application source code, and code connecting a white-box implementation API to another white-box implementation API when they must communicate.

According to embodiments of the this aspect, the white-box call definition data can comprises a white-box call definition file and white-box metadata specifying parameters chosen for each white-box function call, and applying the at least one data transformation to the transformed white-box call definition data generates a transformed white-box call definition file and transformation metadata specifying data transformations chosen for selected parameters. Generating the data initializations can comprise generating a data initialization file in accordance with the white-box metadata and the transformation metadata.

BRIEF DESCRIPTION OF THE DRAWINGS

Other aspects and features of the present invention will become apparent to those ordinarily skilled in the art upon review of the following description of specific embodiments of the invention in conjunction with the accompanying figures.

Embodiments of the present invention will now be described, by way of example only, with reference to the attached Figures, wherein.

DETAILED DESCRIPTION

It is evident that there is a need for a method and system whereby the steps of constructing the peri-cryptic and inter-cryptic portions of applications employing white-box cryptographic functionality can be automated, in order that the current error-prone methods of building such systems can be replaced by far more reliable automated methods. To achieve this, embodiments are disclosed in which the ordinary intra-cryptic portions of applications (the parts which actually perform the white-box operations) become more flexible than they have traditionally been, to fit into the above automated system.

The benefits of such a system are analogous to the benefit that is achieved by compiling code instead of writing hand-crafted assembly code. In theory, good programmers should be able to write an application in handcrafted assembly code. In practice, however, hand-crafted assembly code is immensely error-prone, and compilers, by replacing a low-level, highly detailed software construction regime with a much more automated one, make possible software systems of a complexity which could never have been achieved at the assembly-code level.

One aspect of the instant application is to provide a system and method whereby the peri-cryptic and inter-cryptic aspects of white-box implementations can be abstracted and automated, making it possible for its users to implement uses of white-box cryptographic implementations at a level of complexity which was previously either difficult or infeasible to achieve by peri-cryptic and inter-cryptic hand-coded software, while also benefitting even simpler uses of white-box cryptography by making them far easier for the programmer/user to create, just as even simple programs benefit by replacing hand-crafted assembly code by code compiled from the source code of a high-level language, such as C++.

An aspect of this automation is the unification of the ways in which different forms of cryptographic functionality are expressed. For example, in a compiled language such as C++, the same syntactic form is used for an addition whether it is two integers, two floating-point numbers, or two complex numbers that are being added. The language and its compiler abstract addition as a concept which is implemented appropriately for each context in which it is used, irrespective of whether the implementation is built in to the compiler (as it is for integers and floating point numbers) or is part of a standard library (as it is for complex numbers). A similar unification is disclosed herein for white-box cryptographic operations: if each cryptographic operation has its own unique interface and requires its own unique manner of expression, little automation is possible; much of the responsibility of making appropriate choices must necessarily remain with the programmer/user. If the interfaces and manners of expression are unified, the system can abstract away from particular ciphers and deal with the needs of each context in an automated fashion.

Accordingly, embodiments are disclosed that separate the security related parameters from the user-defined software, which includes API calls used to access white box library tools. This allows for easily changing the type and security level of the protection applied to an application simply by changing the parameters without requiring changes to the user defined software. This allows for field upgradeable capability, wherein the security implementations, and codes can be changed, or additional tools and/or levels of protection can be utilized. In the event that a hacker breaches the security, such a system can respond by providing new and/or additional challenges to hackers by changing the parameters and recompiling the application.

Presently preferred embodiments provide for the possible use of many diverse security implementations, with multiple security measures being possible for each application. This is beneficial to ensure that a successful attack on one implementation does not become a successful attack on all or many implementations of a given software application employing white-box cryptography.

Generally, the disclosed embodiments provide a computer-implemented method and system for integrating white-box cryptography into a software file, which comprises separating the API's and the parameters used to encrypt, obfuscate, or otherwise protect the application or file. A particular benefit of such an integrated development suite is the protection of the boundaries between cryptographic applications and the surrounding application, through the use of data transformations which can be applied in the application and which are understood by the white-box cryptographic implementation.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof. Embodiments of the invention may be represented as a software product stored in a machine-readable medium (also referred to as a computer-readable medium, a processor-readable medium, or a computer-usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

Throughout this document, the term "white-box" is frequently used as a prefix, creating terms like "white-box call", "white-box library", "white-box function", etc. When used as such a prefix, the term "white-box" is shorthand for a "cryptographic implementation designed to provide security against a white-box attacker." Similarly, the term "white-box cryptography" is itself shorthand for a "cryptographic implementation designed to provide security against a white-box attacker". To be clear, in no case does the "white-box" prefix refer to the item itself; since the described embodiments function in a software environment, it is a given that the embodiments and the user's application are an open book to the attacker; in other words, they are a white-box. In reality, these terms are just another shorthand. For example, a "white-box library" is a library containing implementations of cryptographic functions that provide security against white-box attackers, or slightly more succinctly, a library containing white-box cryptography (here we see how "white-box library" is thus a double shorthand). A "white-box function" is one of the functions in the white-box library. A "white-box function call", or just "white-box call", is a call to a white-box function. Other terms should be interpreted similarly.

Figure 1:
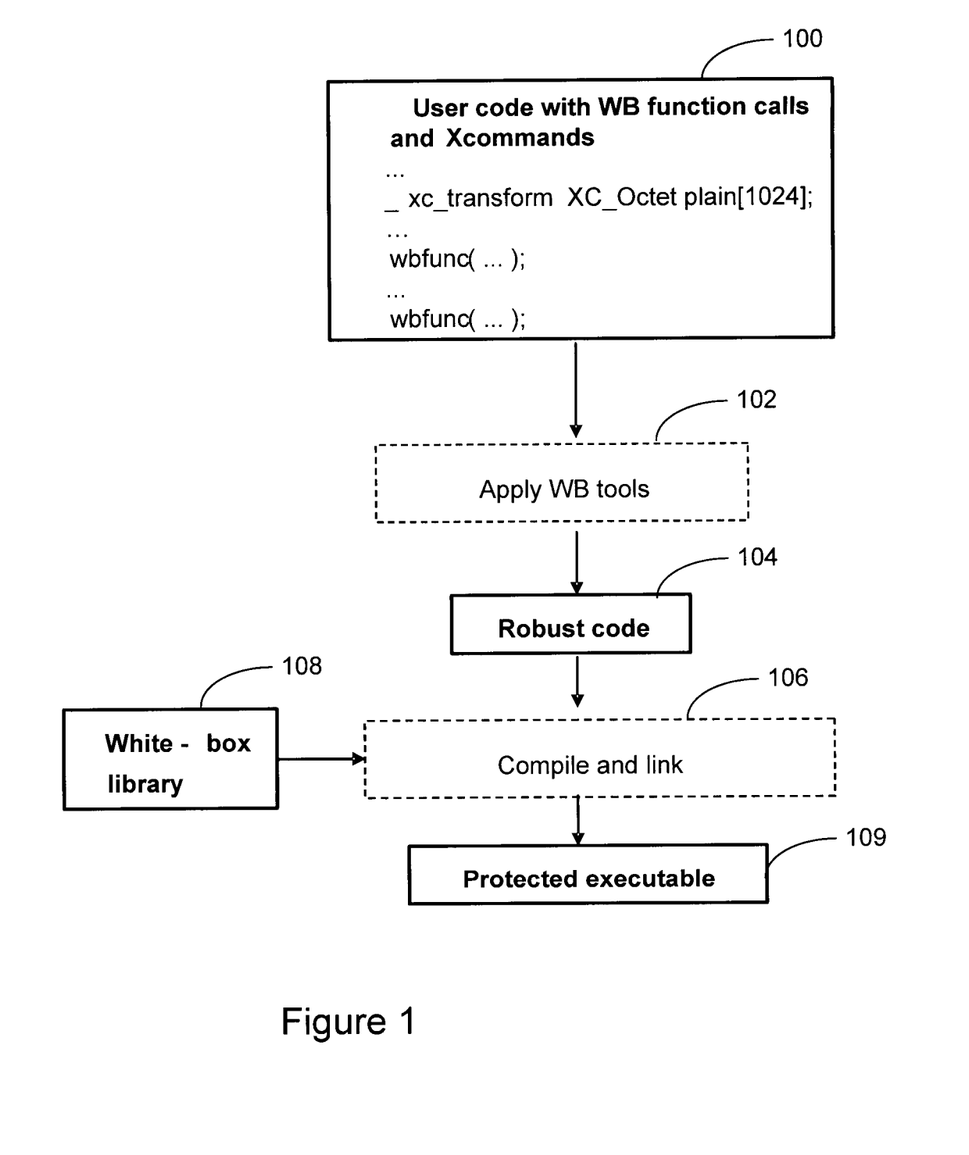
FIG. 1 is a diagram of a basic design flow for white-box cryptography integration according to an embodiment of the invention.

The described embodiments integrate white-box cryptography into a software development suite. Referring to FIG. 1, at a very high level, integration of white-box cryptography into an application according to the present invention involves the user making a number of choices, both functional and robustness-related, about the cryptographic functionality and flow of critical security parameters throughout their application. As shown at 100, the user adds abstracted calls (shown as wbfunc( . . . )) to a white-box API to implement the desired cryptographic functionality, and also adds commands throughout their code to identify the protection required for critical security parameters. Using a number of white-box tools and libraries (step 102) a robust code 104 is then created, which can be compiled and linked (step 106) to a white-box library 108 to create an executable file 109 that performs cryptographic operations in a secure way, and that protects critical security parameters throughout the entire data flow of the application.

Figure 2:
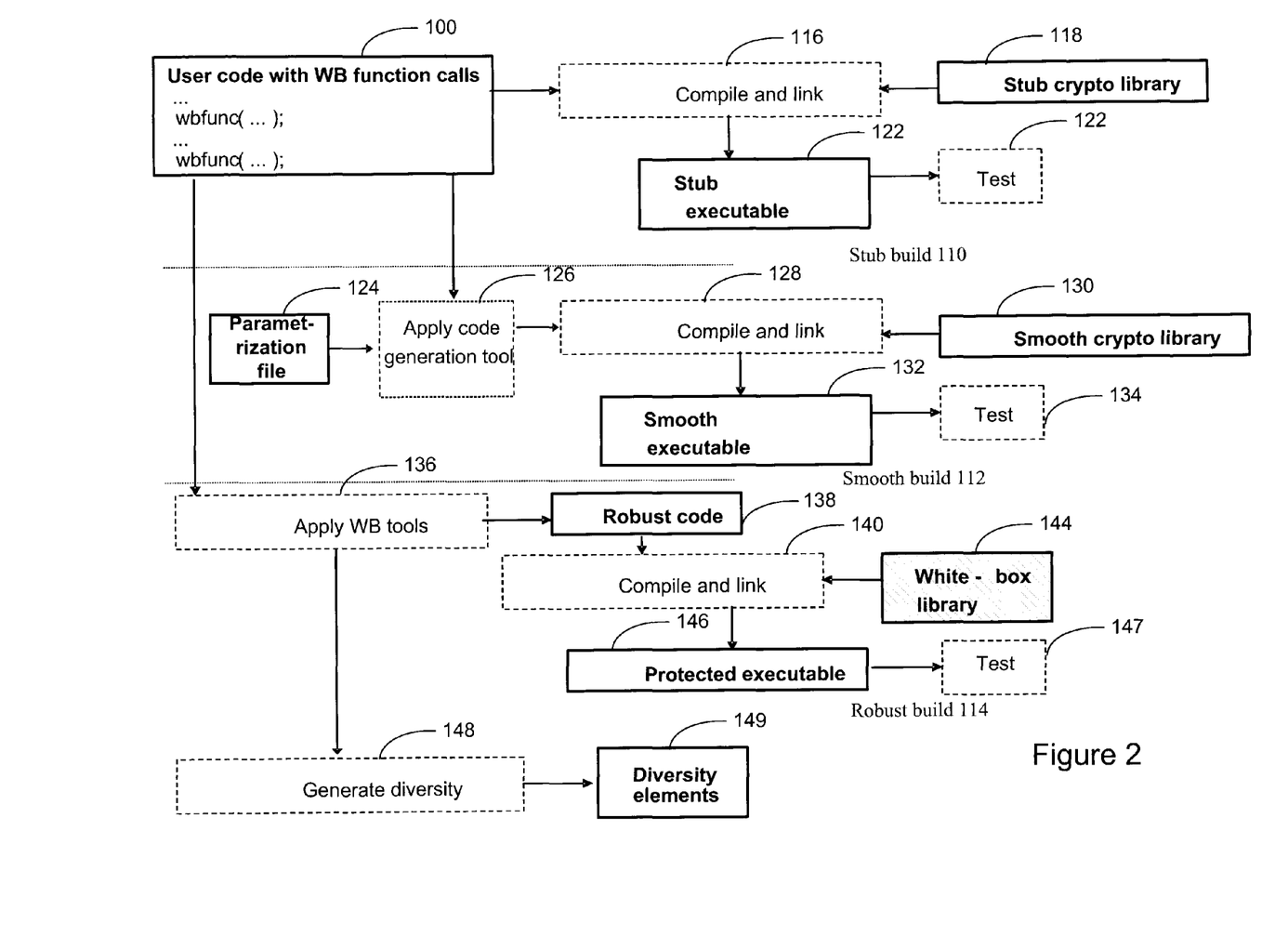
FIG. 2 is a diagram of an expanded design flow for white-box cryptography according to an embodiment of the invention.

Conceptually, however, it is easier to understand the process as an evolution, where the user first makes and implements the most basic choices about cryptographic functionality and key flow in their application, then further refines the functional parameters, and finally takes steps to add robustness. At each stage, there is the ability to build and test the application, and at the end, the user tunes the robust application and optionally personalizes each build. This expanded design flow is shown in FIG. 2, and involves a stub build 110, a smooth build 112, and a robust build 114. The stub and smooth builds 110, 112 are optional, and are described only in broad terms. Their implementation is a design choice, as will be clear to those of skill in the art, and is discussed herein merely for the purposes of illustrating an embodiment of a white-box application development flow according to the present invention.

In the stub build 110, the user adds white-box function calls to the appropriate white-box cryptography APIs to add functionality such as symmetric encryption, asymmetric encryption and hashing to create an input source file 100. The user compiles and links (step 116) their program against stub implementations of the white-box calls, defined in a white-box stub library 118, to generate a stub executable 120, which can then be tested (step 122) to check for compilation and linking errors, as well as basic errors in the key flow. The stub encryption functions, implemented in the stub library 118 are simple, but constructed in such a way that it is unlikely for decryption and encryption to be inverses of one another unless matching parameters are passed to both functions. For example, dynamic-key decryption must use the same key as dynamic-key encryption in order to recover the original message. If these keys are not the same, due to a coding error, a stub decryption is unlikely to properly decrypt the result of a stub encryption to produce the original message.

In the smooth build 112, the user makes some initial, functionality-related choices to parameterize each call, and creates a white-box parameterization file 124 detailing those choices. The user then applies a code generation tool (step 126) to apply the choices made, and compiles and links (step 128) their program against smooth implementations of the white-box calls defined in a smooth version of the white-box library 130. The smooth version of the white-box library 130 simply refers to a library which implements the same API as the true white-box library, but which is smooth. The resulting smooth executable 132 can then be tested (step 134) to ensure basic functionality is working properly.

At the robust build 114, the user makes choices regarding size, speed and security trade-offs in their protected application. The user applies white-box cryptography tools (step 136), which are detailed below, to generate robust transformed code 138. The robust transformed code 138 is then compiled and linked (step 140) to secure implementations of the white box calls in a white-box library 144 to generate a protected executable 146. This protected executable can then be tested (step 147) to ensure both functionality and security. The user then optionally generates (step 148) many diverse instances 149 of data for the purposes of individualization, using a more lightweight process.

Figure 5:
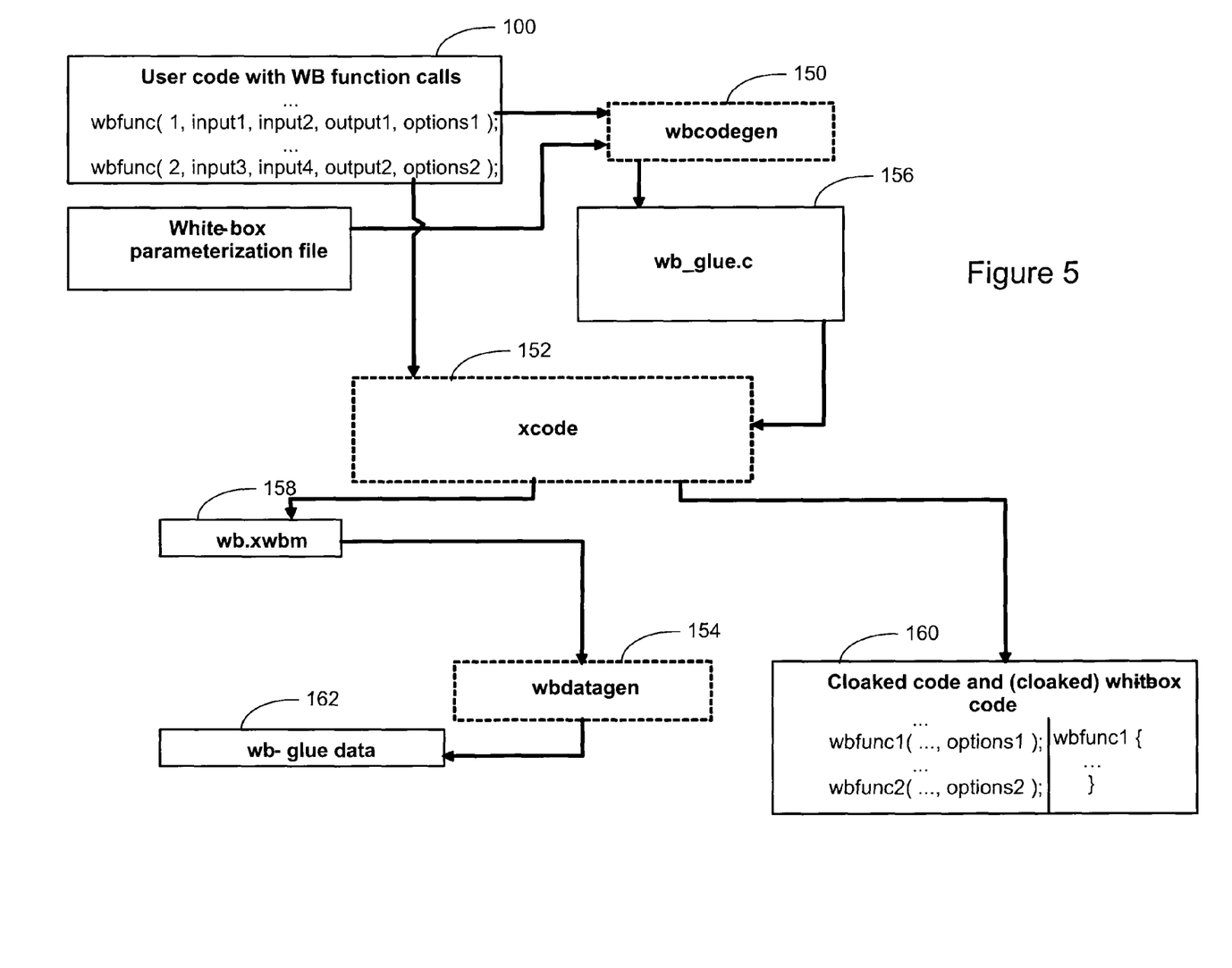
FIG. 5 is a schematic diagram illustrating an embodiment of the invention and its operation.
Figure 6:
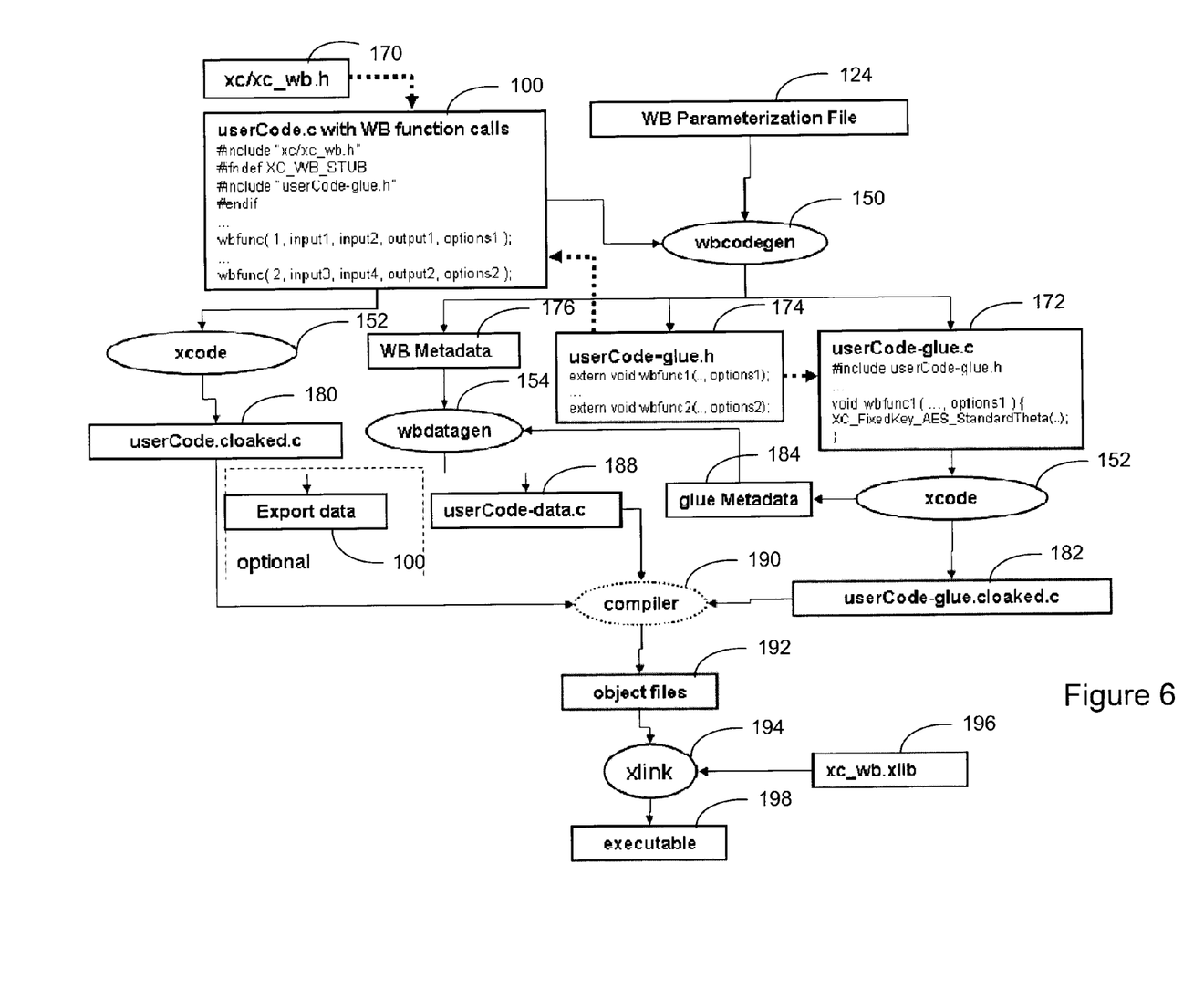
FIG. 6 is a diagram that illustrates the steps for building a robust implementation according to an embodiment of the invention.

The robust build process and components will now be described in greater detail, having referring to FIG. 5 and FIG. 6. FIG. 5 provides a simplified overview of the robust build, while FIG. 6 shows an embodiment of a detailed implementation, which is described in detail below.

The embodiment of FIG. 5 includes three modules for producing a protected file, for example a software application file, namely a white-box code generation tool (wbcodegen) 150, a data transformation engine (xcode) 152, and a white-box data generation tool (wbdatagen) 154. In the white-box cryptography context, the data transformation engine 152 is used to protect the boundary between the cryptographic operation and the surrounding code. In particular, the data transformation engine 152 is used to apply data transformations to the inputs to and outputs from the cryptographic operations. If the user specifies that transformations are required via the white-box parameterization file 124, wbcodegen 150 puts the information specified by the user into a form the data transformation engine 152 understands, namely as qualifiers on data variables and function prototypes. The data transformation engine 152 then applies the specified transformations, and passes information to wbdatagen 154 regarding what transformations were chosen.

The data flow to achieve this is shown at a high level in FIG. 5. The white-box code generation tool 150 receives at least one input source file 100 (userCode) including application source code and abstracted white-box function calls, and a parameterization file 124 containing cryptographic domain parameters for each abstracted white-box function call. The white-box code generation tool 150 processes these inputs to generate white-box call definition data 156 (wb_glue.c) defining each abstracted white-box function call in accordance with its cryptographic domain parameters and in a manner that will be understood by the data transformation engine 152. The data transformation engine 152 then applies one or more data transformations to the input source file 100 and the white-box call definition data 156 to generate a transformed source file 160 and transformed white-box call definition data 158 (wb.xwbm).The data generation tool 154 then generates data initializations 162 (wb-glue data) containing instance-specific data for each white-box function call in accordance with the transformed white-box call definition data 158. The data initializations 162 and the transformed source file 160 can then be compiled using a native compiler, and linked to a white-box library.

White-Box API

Once the user has identified a need for cryptography in their application, they have two choices for each call to the API they will make. These choices will determine the basic key flow of their application. (1) What is the cryptographic operation to be performed? Possible operations include encryption, decryption, signature, signature verification, hashing, etc. (2) Will the key for this call only be available at run-time, or will it be available before? Keys such as session keys or content keys are usually either generated dynamically, or are computed as the result of an asymmetric decryption. We broadly call such keys dynamic. Keys which are known at build-time, or which can be obtained through some off-line subscription/renewal process, on the other hand, are called fixed keys. Certainly, all keys can be treated as dynamic, but where keys can be treated as fixed, there is a security advantage in doing so.

Once the above decisions have been made, the user application code can be written to invoke the API appropriate to that selection. The user application, which is the input source file 100, consists of source code (such as in C or C++) containing invocations of cryptographic operations such as key scheduling, encryption, decryption, etc, using a very minimal API. Key user-provided data such as ciphertext, plaintext, iv, etc., are passed as parameters to these invocations, along with a numeric constant ID parameter which is used to group related calls into a single cryptographic domain. In a preferred embodiment, the user application-code will be required to include an include file 170: xc/xc_wb.h, which defines white-box types and macros. All cryptographic operations can be invoked using macros from this include file 170. Preferably, the white-box include file 170 (xc/xc_wb.h) provides a single macro definition for each of the cryptographic operations for all cipher types. The macros take as parameters the minimum set of user-supplied parameters (typically application data such as plaintext/ciphertext), a single ID parameter (to identify the cryptographic domain of the operation), and an options parameter. For example, a block cipher encrypt call is shown below. Note that the macro invocation (XC_Fixed_Key_Block_Cipher_Encrypt) is very abstracted, and specifies only the actual application data required for the cryptographic operation.

```
#include "xc/xc_wb.h"
...
XC_Octet plain[16];
XC_Octet cipher[16];
int csize;
int ret;
/* Load plaintext into plain */
ret = XC_Fixed_Key_Block_Cipher_Encrypt( 1, plain, 16,
cipher, &csize, NULL, 0, NULL );
if (ret != XC_OK) {
    /* issue error */
}
/* Process ciphertext */
```

The white-box include file 170 (xc/xc_wb.h) defines the entire white-box API from the perspective of the user's application code. This API is in the form of function-like macros that define all the abstract cryptographic operations available for use in application code. Moreover, this include file 170 describes the contents of the white-box glue files, described below, again in the form of macro definitions. The following exemplary code snippets show the high-level details of a single abstract API, for the Fixed-Key, Block-Cipher Encrypt operation:

```
#ifdef XC_WB_INFO
// Definitions common to Smooth and Robust invocations:
#define XC_Fixed_Key_Block_Cipher_Encrypt(ID, PLAIN,
PLAINSIZE, CIPHER, PCIPHERSIZE, IV, IVSIZE,
OPTIONS) \
<XC_Fixed_Key_Block_Cipher_Encrypt> \
_XC_TCGEN(_XC_GLUE, ID, MAIN, cat(XC_Fixed_Key_
Block_Cipher_Encrypt_,ID), ) \
    _XC_TCGEN(_XC_ASSERT, \
        FunctionType=BlockCipher \
        KeyLocation=Fixed \
        Operation=Encrypt \
    ) \
    XC_Block_Cipher_Glue(ID,) \
)
#define XC_Block_Cipher_Glue(ID, SUBOP) \
    XC_Block_Cipher_Externs(ID, SUBOP) \
    int MangledName cat(XC_Block_Cipher_Op_Prefix(SUBOP),
Prototype) { \
        return XC_Block_Cipher_Main_Invocation(ID, SUBOP) ( \
            cat(XC_Block_Cipher_Op_Prefix(SUBOP),Base_
Params)(ID) \
            XC_Block_Cipher_Additional_Params(ID, SUBOP) \
        ); \
    }
#ifdef XC_WB_SMOOTH
// Definitions of such sub-macros as XC_Block_Cipher_Externs etc.
// for a Smooth implementation
#else /* not XC_WB_SMOOTH*/
// Definitions of such sub-macros as XC_Block_Cipher_Externs etc.
// for a Robust implementation
// All _Params macros generated by XC_Robust*_Prefix are defined here:
#include "xc_wb_bc_dk_aes_keysched_tables.h"
#include "xc_wb_bc_fk_aes_tables.h"
#include "xc_wb_bc_dk_aes_tables.h"#endif /* XC_WB_SMOOTH */
#endif /* XC_WB_SMOOTH */
#else /* not XC_WB_INFO */
// This section is for normal macro-expansion
// xcWBCodeGen is not in play, and thus _XC_TCGEN( ) operators may not
appear
    #ifdef XC_WB_STUB
    // Stub build
    #define XC_Dynamic_Key_Block_Cipher_Encrypt_ KEY,
```

```
Key_Schedule(ID, KEYSIZE, PRKS, OPTIONS) \
    XC_Dynamic_Key_Block_Cipher_Encrypt_Key_   KEY,
Schedule_Stub(ID, KEYSIZE, PRKS, OPTIONS)
    #else /* not XC_WB_STUB */
    // Smooth or Robust build (these are identical at macro-expansion
level)
    #define   XC_Dynamic_Key_Block_Cipher_Encrypt_   KEY,
Key_Schedule(ID, KEYSIZE, PRKS, OPTIONS) \
        cat(XC_Dynamic_Key_Block_Cipher_Encrypt_Key_
Schedule,ID)(KEY, KEYSIZE, PRKS, OPTIONS)
    #endif /* XC_WB_STUB */
#endif /* XC_WB_INFO */
```

Often times, cryptographic functions are not performed in isolation. Instead, an application contains a series of keys, usually in a hierarchical structure, and cryptographic operations are chained, with the lowest keys in the hierarchy used to protect content, and more valuable keys used to protect the lower level keys. At the top of the hierarchy there will be one or more "roots of trust", keys whose disclosure would expose every other key, and thus result in a complete security breach.

Figure 3:
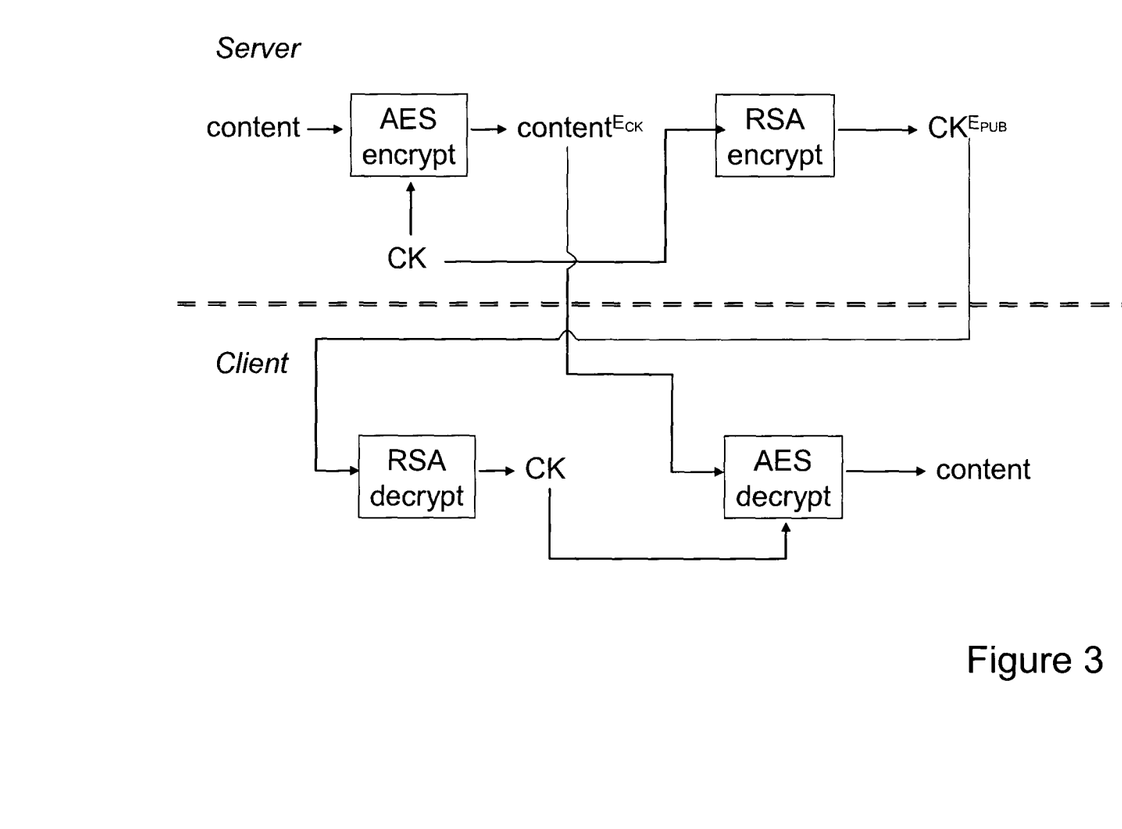
FIG. 3 is a diagram of a chained encryption scenario according to an embodiment of the invention.

A simple example of a hierarchy would be to have content, such as a music file, protected using AES encryption with a random key called the content key. The content key would itself be protected using RSA encryption with a client-specific public key. The root of trust is then the (often fixed) RSA private key that is part of the client application. This hierarchy is shown in FIG. 3. Generally, any scenario where the output of one cryptographic operation becomes one of the inputs to a subsequent cryptographic operation is referred to as chained encryption. Another frequently occurring example of chained encryption is also known as transcription. This involves the decryption of some content using one algorithm and key, followed by the immediate re-encryption of that same content using another algorithm and key. This is often done at the boundary between two programs in communication with one another, or at the boundary between software and hardware.

There is a distinct security benefit in considering chained encryption operations as a single operation, namely that the value passed from one operation to the next can be well hidden, as opposed to being exposed at the boundary between the two operations. While transforming this value at the boundary between operations is certainly also feasible, and does provide protection, a true blending of the chained operations offers greater flexibility in the security techniques that can be applied, and thus, better overall protection.

Figure 4:
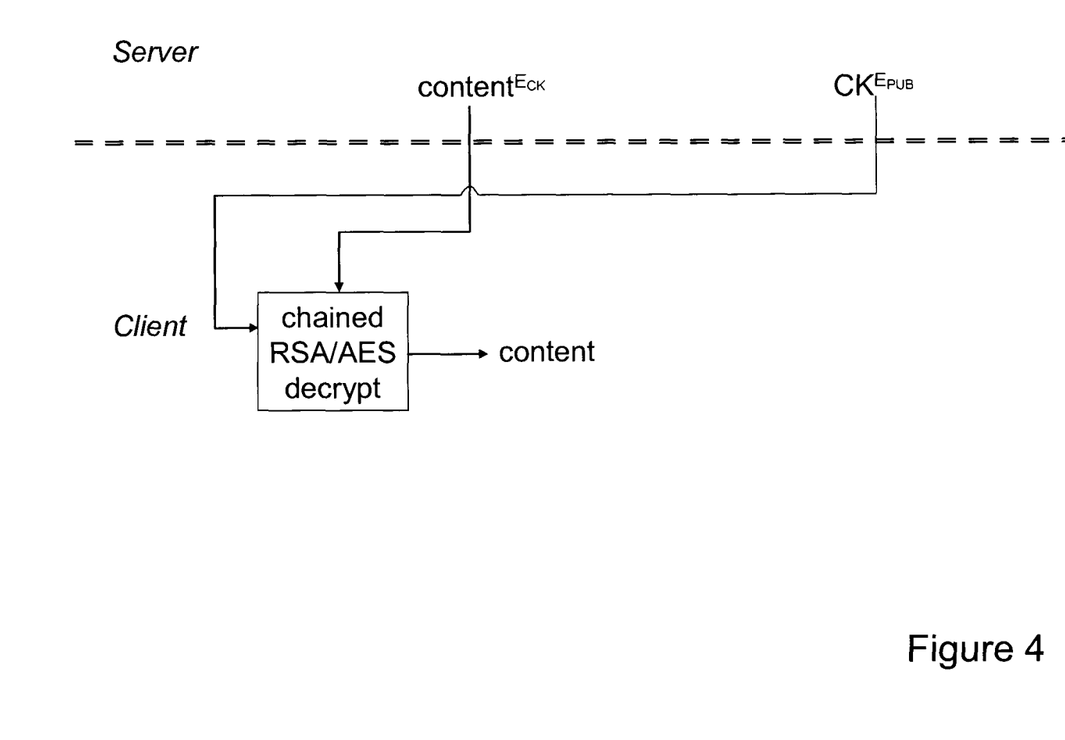
FIG. 4 is a diagram of a chained encryption scenario in which a chained encryption API is utilized according to an embodiment of the invention.

The white-box infrastructure and API described herein can easily be extended to support multiple chained encryption scenarios. A specific example is given below. This example corresponds to the client side of FIG. 3, modified to combine the RSA and AES decrypts into a single chained decryption. FIG. 4 shows this change. Note that the decrypted content key no longer appears in the figure. This example is illustrative only.

```
#include "xc/xc_wb.h"
...
XC_Octet ekey[128];
XC_Octet cipher[65536];
XC_Octet plain[65536];
int psize;
int ret;
/* Load encrypted content into cipher */
/* Load encrypted content key into ekey */
ret = XC_Fixed_Key_Chained_Cipher_Decrypt( 2, cipher, 65536,
plain, &psize,
    ekey, 128, NULL );
if (ret != XC_OK) {
    /* issue error */
}
/* Process plaintext */
```

White-Box Parameterization

Once the user has validated their key flow, they have to make a series of functional choices to further parameterize each white-box cryptography function call. Most of these questions are cipher-specific, but some examples of general questions are: (1) What algorithm is needed? Often, the algorithm to use is specified by some relevant standard. (2) What size of key is needed? Valid choices here depend on the algorithm. These decisions are captured in a user-provided white-box parameterization file 124, which is then processed, along with the user's source code, in order to build the executable file.

The main mechanism by which the user makes choices about specific aspects of the cryptographic operations (as basic as which algorithm to use, and as detailed as which key to use) is via the white-box parameterization file 124. This file, written by the user, provides details about each call to a white-box function. In an embodiment, the format of the white-box parameterization file 124 is line-oriented text, consisting of cryptographic domain parameter names and cryptographic domain parameter values. These parameter name/value pairs (hereafter referred to as "cryptographic domain parameters" or simply "parameters") are grouped to make up individual white-box parameterization records. The start of each record is delimited by the presence of an identifier (ID) parameter, and ends at the next occurrence of Identifier (or end-of-file). Within the scope of a parameterization record, an arbitrary number of unique parameters may be listed (duplication of any parameter name is an error). As will be understood by those of skill in the art, certain parameters may be omitted and can have default values, while other parameters are mandatory and must be provided. In any case, the scope of an individual parameter is to the current parameterization record only.

The value of the ID parameter is used to identify white-box calls. As such, it is preferred that:
1. The ID is a literal integer constant, so that a given call consistently maps to a given record in the parameterization file 124.
2. Each call is given a unique ID, so that a given record in the parameterization file 124 maps to a unique call. There can be exceptions to this rule:
   a. Calls that are chosen to share data must be given the same ID.
   b. Other cipher-specific exceptions.

For each ID, the white-box parameterization file 124 will contain a record, which will list certain parameters associated with that record, with one parameter listed per line of the file. The parameters of a white-box record can be divided into three broad categories.

Categorization parameters: these describe the category of cryptographic algorithm to be employed, such as block cipher or asymmetric cipher, and fixed key versus dynamic key. These parameters serve a dual purpose; first, they make a parameterization file record self-contained, in the sense that a user can look at such a record and know exactly what the behavior of the corresponding white-box call will be, and second, they allow for error checking, as the specification of these parameters determine exactly which user-provided parameters are expected.

Functional parameters: these describe specific attributes of the cryptographic algorithm to be employed, such as the number of rounds, and will be passed as parameters or options to the white-box API (this is done automatically and is transparent to the end-user). Note that Algorithm is considered a functional parameter (e.g. Algorithm=AES vs. Algorithm=DES) and not a categorization parameter.

Robustness parameters: these describe specific decisions relating to robustness features of the white-box invocation, such as transforms on selected parameters.

The highest-level categorization parameter is FunctionType. Other valid categorization parameters, as well as functional and robustness parameters, are dependent on the value specified for FunctionType. The following example shows a typical white-box parameterization entry for a block cipher. Most of the listed parameters are cipher-specific, and their meaning will not be described here.

---

Identifier 1
FunctionType BlockCipher
KeyLocation Fixed
Operation Encrypt
Algorithm AES
Mode ECB
FixedKey 00000000000000000000000000000000
KeySize 16
KeyType Standard
NumRounds 10

---

At this point, the user must make a number of security related choices. Wherever possible, all inputs to and outputs from a call to a white-box cryptography function should be transformed. Specifically for block ciphers, the plaintext, ciphertext, key (for dynamic-key functions) and initialization vector (for modes other than ECB) should be transformed. As an example, the set of available transformations, in increasing order of security, can be:

---

| Transformation Family | Performance |
|---|---|
| Finite | High |
| ArrayFinite | High |
| LinearMBA | Medium |
| MultiMBA | Medium |
| RandomByte | High |
| ArrayRandomByte | High |
| RandomMatrix | Low |
| RandomMatrixAndByte | Low |

---

Preferably, all data transformations can be used on inputs and outputs. The user may specify logical transform types for inputs and outputs in the white-box parameterization file 124. For example the user could specify, for a given id, the following entry: PlainTransform blue. This indicates that the plaintext of the call corresponding to the given ID will be transformed using the "blue" logical transform type. All cipher inputs and outputs to be transformed must have an appropriate Transform entry in the white-box parameterization file 124. Many of the white-box functions, most notably white-box AES, can be implemented in several different ways. Each of these ways, known as an encryption type, makes a different trade-off between size, speed and security. The user is responsible for providing a transform type mapping for each logical transform type listed in the white-box parameterization file 124. This is normally done via the config file, but may also be supplied directly on the command line.

As described above, the connection between a white-box call and a parameterization file record (and therefore an instance-specific set of code and data) is the ID parameter. Thus, if two calls to the same function are given the same value for the ID parameter, they will refer to the same white-box parameterization file record, and will ultimately resolve to the same white-box library call, thereby sharing the data associated with that call. In other words, to have two white-box calls share data, they can be given the same ID. Note that shared data only makes sense if the two calls are to the same abstracted API, and also if the data transformations on the inputs and outputs are identical.

Wherever the user has chosen to store the data for a white-box cryptography call externally, there must be a corresponding call added to retrieve the external data and put it in an appropriate form. For example, the fixed-key block cipher encrypt example might be enhanced as follows.

Exemplary input source file:

---

```
#include "crypto.h"
#endif
#include "xc/xc_wb.h"
...
_xc_transformtype(blue) XC_Octet plain[16];
_xc_transformtype(green) XC_Octet cipher[16];
int csize;
XC_BlockCipherOptions options;
int ret;
/* Load plaintext into plain */
#ifdef XC_ENABLED
ret = XC_Import_Data_From_File( 1, &options );
if (ret != XC_OK) {
    /* issue error */
}
#endif
ret = XC_Fixed_Key_Block_Cipher_Encrypt( 1, plain, 16, cipher,
&csize,
NULL, 0, options );
if (ret != XC_OK) {
    /* issue error */
}
ret = XC_Free_Data_Holder( 1, &options );
/* Process ciphertext */
```

---

Exemplary parameterization file (wbinfo.wbp):

---

Identifier 1
FunctionType BlockCipher
KeyLocation Fixed
Operation Encrypt
Algorithm AES
Mode ECB
FixedKey 1ED0861E06A180AC197BDB3FB54D50D9
KeySize 16
KeyType Standard
NumRounds 10
EncryptionType Eta
DataStorage Export
OutputFile "cryptodata.dat"

---

White-Box Code Generation

One of the difficulties of preventing attacks is that the white-box cryptographic implementation itself can substitute for the key. If the white-box software implementation embeds the key by partial evaluation, and implements decryption, then that entire application can be used instead of the key to perform decryption. That is, instead of determining what cipher is being implemented and what is the key, an attacker can simply extract the entire white-box decryption implementation and use it for decryption. This is called 'snipping' or 'code-lifting' the white-box decryption.

The complexity of defending against such attacks provides a good example of the advantages for automating the peri-cryptic and inter-cryptic aspects of systems employing white-box cryptography. For example, white-box cryptographic implementations employ arrays of data. To make such arrays, or tables, difficult to remove by 'snipping', each table can be split into two parts. One part is a segment of executable code somewhere in the software outside of the white-box implementation. The other is a data table of the same size which contains 'xor' data which, when exclusive-or'ed with the corresponding part of the code segment, yields the desired table. This makes it difficult to lift the white-box code, since it only executes correctly when the needed data segment is present. Another method is to replace the code segment by other application data outside the white-box cryptographic implementation, so that without the data outside the white-box implementation, the data arrays inside it are not useful. In yet another method, the data tables can be replaced by tables which access scattered locations throughout the program employing white-box cryptography. Each data table is then replaced by a table of pointers to many locations throughout the code or data of the remainder of the program where appropriate pieces of data may be found—that is, each original table is replaced by a table of pointers to locations containing the desired original data. These methods require tools, and a highly skilled programmer with access to the compiled binary code of the remainder of the application, to edit the executable code and replace the original table with the 'xor' data or otherwise modify the tables. The white-box code generation tool 150 automates such methods and generates "glue" code to ensure that the inputs and outputs at the boundary of cryptographic operation are effectively obfuscated.

Once the parameterization file 124 has been created, the user must run a white-box code generation tool 150 that parses the parameterization file 124 and generates a white-box call definition file 172 that will make appropriate calls into the white-box library. The white-box code generation tool 150 is referred to hereafter as wbcodegen 150. wbcodegen 150 is primarily responsible for processing the user application-code (specifically, files that contain calls to the white-box cryptography APIs) along with the white-box parameterization file 124, and generating white-box call definition data (also referred to herein as white-box call definition, or "glue", files) that includes transformation qualifiers that will be understood by the data transformation engine 152. The white-box call definition data provides a set of function definitions of the "glue" routines that map between the highly abstracted API used in the user application and the low-level white-box routines provided in the white-box library.

The wbcodegen tool 150 is responsible for the generation of white-box glue code, based on invocations of white-box APIs in the user's source-code, and the description of the cryptographic domains contained in the white-box parameterization file 124. The white-box glue code serves as a shim between the highly abstracted API in the user's source-code and the actual invocation of white-box library cryptographic operations, and ensures that user source-code does not have to be modified when changes to white-box parameterization are made. wbcodegen 150 can be designed as an extension of the a pre-processor, to improve processing speed. Preferably, wbcodegen 150 is completely separate from the data transformation engine 152.

Preferably, wbcodegen 150 does not in any way modify the user application-code, and the white-box glue files it produces are in separate source files intended to be compiled and linked into the final application. Additionally, wbcodegen 150 can serve as a validation tool for the white-box parameterization file 124 (checking that parameter names are legal, that parameter values are valid, and consistency checking the specified parameters within a record). Finally, wbcodegen 150 can also be used to detect errors involving both explicit and implicit parameter errors to white-box operations in the user's application-code (for example, specification of an ID parameter referring to an asymmetric cipher on a block cipher operation).

wbcodegen 150 takes as inputs the parameterization file 124, and the input source file(s) 100 that contain white-box cryptography calls. The output is a white-box call definition file 172 (userCode-glue.c) that contains definitions for each white-box cryptography call found. The tool also generates a corresponding white-box glue header 174, or simply header, file (userCode-glue.h) containing prototypes for each of the generated functions, which can be, for example, a set of extern declarations of "glue" routines, one per combination of ID and basic cryptographic operation. wbcodegen 150 also generates an output white-box metadata file 176 that holds metadata regarding choices made for each white-box call; this metadata is passed to the data generation tool 154 (wbdatagen), described below.

The user is responsible for re-running wbcodegen 150 whenever either the application code is updated with new invocations of the abstracted white-box APIs, or when the white-box parameterization file 124 is modified.

As described above, the wbcodegen tool 150 is responsible for processing the user's source-code along with the white-box parameterization file 124 and expanding the user's abstracted white-box API invocations to fully parameterized calls to low-level white-box library routines. The wbcodegen tool 150 can, for example, consist of a top-level Perl front-end (or driver) that will accept and parse parameters. The Perl front-end can also validate the parameterization file contents, checking for syntactic/semantic errors in the line-oriented text contents, and transforming it to a form acceptable to the wbcodegen back-end. The wbcodegen back-end can process the user's source code along with the transformed parameterization file.

Most of what the wbcodegen back-end must do is very similar to macro-expansion. Every invocation of an abstracted white-box API is expanded to a "mangled" form in which the ID parameter is made part of the invocation name. The source location of every white-box API invocation is recorded in a separate metadata file. The first invocation of a unique mangled name (i.e., white-box API name with appended ID parameter) triggers the generation of an appropriate function definition that invokes the actual underlying white-box library function. Various forms of parameter consistency checking can also performed and errors emitted to ensure correctness of the user-application and parameterization file 124 before compile/link/execute time.

Command-line parameter/option parsing can be performed by a Perl driver. The Perl driver will do sanity checking on parameter values, and can optionally invoke a white-box parameterization file preprocessor/validation tool (not shown). The driver can then invoke the wbcodegen back-end on each command-line specified source-file. One complication of this approach is that certain state information must persist between invocations of the wbcodegen back-end (in particular, it must know which white-box operation/ID combinations have already been seen in source files previously processed, so that it can appropriately generate the unique glue-code function definitions, as well as warn about duplicated invocations). To solve this problem, the wbcodegen driver can be set to open a temporary file, which will be passed to each back-end invocation, and will contain any such state information. The lifetime of this temporary file is one invocation of wbcodegen 150, and can be removed before wbcodegen 150 terminates. As such, this file is completely invisible to the user.

Due to the relative complexity of the white-box parameterization file formatting (parameters may be implied in some contexts even when absent, i.e., they have default values), or may be illegal in combination with other parameter values. The result is that the pre-processing of the parameterization file 124, prior to parsing by wbcodegen 150, may be implemented. The pre-processing tool can be written in Perl, due to the powerful regular-expression facilities of that language. A white-box parameterization validation tool (not shown) can be included to handle missing default parameters by explicitly inserting a record with the default value, and validate that parameter values are legal, and that combinations of parameters are consistent. At the same time, the white-box parameterization preprocessor can convert the free-format text ID records into appropriate macro invocations.

It is contemplated that the typical usage scenario will involve an application built of multiple input source files 100 and a single white-box parameterization file 124, thus implying that there will be one invocation of wbcodegen 150 (taking as input all the source files which contain calls to white-box APIs, along with the single white-box parameterization file 124). However, nothing in the design precludes partitioning the application into several modules, each with its own white-box parameterization file 124 (or indeed a single shared white-box parameterization file 124 for all modules), and processing each of these modules with corresponding invocations of wbcodegen 150.

Once a single developer has run wbcodegen 150, it is not necessary for other developers to rerun it as part of their builds. Instead, the developer can include the generated header file 174 as described above, and add the generated file to build scripts. At that point, anyone wishing to compile and link the application needs only native compilation tools.

White-Box Data Transformation

Once the code generation tool 150 has been run, it is preferred to perform data transformations to protect the inputs and outputs to white-box calls. A data transformation engine 152, shown in the drawings as xcode, performs this function (also referred to herein as "transcoding") on the input source file(s) 100 and the glue code containing the white-box function call definitions. The data transformation engine 152, such as the Cloakware Transcoder™, is used to provide the white-box functionality, using data transformations, in the described implementations. The output of this data transformation is a cloaked, or obfuscated, transformed source file 180 (userCode.cloaked.c), a cloaked, or obfuscated, call definition file 182 (userCode-glue.cloaked.c), and a file containing external transformation metadata 184 (glue metadata). The generated transformation metadata file 184 describes data transformation choices on selected parameters to the white-box glue functions.

The white-box cryptography implementations assume that transformations on application data (e.g. plain for encrypt, cipher for decrypt, plus key and IV where appropriate) have been applied outside the scope of the white-box call, and securely removes those transformations in the initial steps. Similarly, transformations on output variables (e.g. cipher for encrypt, plain for decrypt) are securely applied in the final steps of the cryptographic operation; the data transformation engine 152 assumes the data in these variables is transformed.

The functioning of the data transformation engine 152 is outside the scope of this document, but can generally be understood to apply data transformations to obfuscate or cloak variables and mathematical operations on data, particularly cryptographic operations, to ensure it is not visible to an attacker and does not reveal information damaging to the critical assets. The data transformation engine 152 can also apply control flow transformations to disguise the programmatic flow of the application, making it very difficult for an attacker to statically or dynamically trace the operation of the application. The data transformation engine 152 can be considered a utility that transforms source code into mathematically modified source code. Transformed applications are functionally identical to the originals but are highly resistant to reverse engineering and tampering attacks. The protected application reliably executes on open computing platforms without special hardware or additional software.

The data transformation engine 152 also links white-box cryptography with code transformations to deliver integrated and layered protection that is far more secure than individual techniques alone. White-box cryptography, the details of which are also outside the scope of this description, implements standard cryptographic algorithms in a way that prevents an attacker from obtaining the cryptographic key (or, in the case of asymmetric 'public key' cryptography, from obtaining the private key), or of obtaining something that can substitute for the key, in environments where hackers can observe cryptographic operations in complete detail. White-box cryptography can implement ciphers, such as RSA and AES, to ensure that critical key data is not revealed—even during cryptographic operations.

Examples of data transformation and white-box cryptography implementations can be found in the following patent documents: TAMPER RESISTANT SOFTWARE ENCODING AND ANALYSIS, US Patent Publication 2004/0236955-A1; SOFTWARE CONDITIONAL ACCESS SYSTEM, US Patent Publication 2005/0039025-A1; METHOD AND SYSTEM FOR SECURE ACCESS, U.S. Pat. No. 7,325,141; METHOD AND SYSTEM FOR SUSTAINABLE DIGITAL WATERMARKING, US Patent Publication 2005/0021966 A1; SECURE METHOD AND SYSTEM FOR BIOMETRIC VERIFICATION, US Patent Publication 2005/0138392 A1; SECURE METHOD AND SYSTEM FOR COMPUTER PROTECTION, US Patent Publication 2004/0268322 A1; SECURE METHOD AND SYSTEM FOR HANDLING AND DISTRIBUTING DIGITAL MEDIA, US Patent Publication 2005/0021989-A1; SYSTEM AND METHOD FOR OBSCURING BIT-WISE AND TWO'S COMPLEMENT INTEGER COMPUTATIONS IN SOFTWARE, US Patent Publication 2005/0166191 A1; SYSTEM AND METHOD FOR PROTECTING COMPUTER SOFTWARE FROM A WHITE BOX ATTACK. US Patent Publication 2006/0140401-A1; SYSTEM AND METHOD FOR PROTECTING COMPUTER SOFTWARE FROM A WHITE BOX ATTACK, US Patent Publication 2004/0139340-A1; SYSTEM AND METHOD OF FOILING BUFFER-OVERFLOW AND ALIEN-CODE ATTACKS, US Patent Publication 2003/0172293-A1; SYSTEM AND METHOD OF HIDING CRYPTOGRAPHIC PRIVATE KEYS, US Patent Publication 2005/0002532-A1; TAMPER RESISTANT SOFTWARE-CONTROL FLOW ENCODING, U.S. Pat. No. 6,779,114; TAMPER RESISTANT SOFTWARE ENCODING, U.S. Pat. No. 6,594,761; TAMPER RESISTANT SOFTWARE ENCODING, U.S. Pat. No. 6,842,862; TAMPER RESISTANT SOFTWARE- MASS DATA ENCODING, U.S. Pat. No. 7,350,085; the contents of which are all incorporated herein by reference in their entirety.

White-Box Data Generation

Each uniquely identified call to a white-box cryptography function will have associated data, which must be generated based on the functional and security-related choices made for that call. The white-box data generation tool 154 that generates this data is hereinafter referred to as wbdatagen 154.

The wbdatagen tool 154 is responsible for generating initialization of instance-specific data for a white-box call, in the form of initialized table data, required by the white-box library. Each cryptographic domain that is utilized in cryptographic operations somewhere in the user's application will necessitate the generation of such table data. The exact values of the initialized data are dependent on the transformations of the user's cryptographic data (plaintext/ciphertext, etc) as produced by any transformation of the user's source-code. For example, different calls (even those with the same functional parameters) likely use different keys and have different transformations on their inputs and outputs. Also, random implementation choices are made by the tool chain for each white-box call. wbdatagen 154 generates the implementation-specific data that encapsulates all these choices.

During invocation, this data is passed to the key- and transformation-agnostic white-box library code (xc_wb.xlib). wbdatagen 154 does not need to process the user application code itself, as it is expected that wbcodegen 150 has already analyzed the source-code and written any required information to the white-box metadata 176.

The wbdatagen tool 154 takes as input the white-box metadata 176 generated by wbcodegen 150, and the external transformation, or glue, metadata 184 created by the data transformation engine 152 (if the glue code was transformed). This information tells wbdatagen 154 which cryptographic operations are found in the user application code, what cryptographic parameters were specified in the white-box parameterization files for those operations, and what data transformations were applied to user-data passed as actual parameters. The wbdatagen tool 154 generates code defining the white-box data, and optionally export data files 186.

The output of wbdatagen 154 is a data initialization file 188 (userCode-data.c) containing data corresponding to each record in the parameterization file 124. The data initialization file 188 contains a set of data variables ("data initializations") that encapsulate the instance-specific data for each white-box call. The data values are either also stored in this file, or are stored in one or more output files specified by the user in the parameterization file 124. If all data to be generated is export data, wbdatagen 154 can, in fact, be run after compiling and linking. wbdatagen 154 can be run to generate embedded data (and optionally, export data) by a single developer. At that point, anyone wishing to compile and link the application needs only native compilation tools.

Definitions of the white-box table data parameters are generated by wbdatagen 154, but the glue code must ensure that they are passed as actual parameters to the white-box library invocations as appropriate. Of particular note is the sub-included files (xc_wb_bc_fk_aes_tables.h, etc.) detailed above in relation to the exemplary white-box include file 170. These define in detail the formal parameters to each possible variant of the white-box cryptographic operations, and are used to generate the bulk of the text in the white-box glue files 172, 174. These sub-include files are preferably auto-generated by a program which also generates the white-box library code itself. In this way, much of the dependency on the exact form of the low-level white-box API is automatically maintained.

wbdatagen 154 is generally re-run whenever either the application code is updated with new invocations of the abstracted white-box APIs, or when the white-box parameterization file 124 is modified, or when the application code is transformed.

Compiling and Linking Transformed Code

To compile and link the transcoded or transformed code, the transformed source file 180 (userCode.cloaked.c), the transformed white-box call definition file 182 (userCode-glue.cloaked.c), and the data initialization file (userCode-data.c) are compiled, using the same native tooling compiler 190 that is used to compile the user application code, to generate object file(s) 192, and linked, by a linker 194 (xlink), against the white-box library 196 (xc_wb.lib) to generate a protected executable file 198. Details of the cryptographic operations implemented by the white-box library and the exact API of the individual subroutines are outside the scope of this document.

Performance Tuning

During testing of transformed code, the user may discover that they are not happy with the performance or size of the application, or may alternately find that the performance is more than acceptable, and there are areas where security can be improved. At this point, any of the functionality or security choices made in earlier steps can be revisited, and changes only need to be made to the parameterization file 124. Several parameters can be changed to make different size/speed/security trade-offs. For example:

The encryption type can be changed, either to a higher performance variant, or a higher security variant.

The number of rounds (where meaningful) can be reduced for higher performance and smaller size, or raised for higher security.

Data shuffling can be turned on for higher security, or off for higher performance.

Different white-box calls can be given the same ID to reduce size, or calls that had the same ID can be given different ones to improve security.

The data transformation settings at which the application code or generated code are transformed can be lowered to improve performance, or raised to improve security. The user may even choose to not transform the generated code at all.

The described white-box tool chain has no impact on a user's ability to use anti-debug and integrity verification within their application. Further, a user can add defense in depth to their white-box calls by, for example, putting anti-debug timing points before and after such a call, or by signing and integrity checking the module that includes the white-box library.

Generating Diverse Instances

It is often beneficial from a security standpoint to have more than one instance of an application. Application diversity can mean distributing several different, but functionally equivalent versions of an application to a user base, or making frequent updates to fielded applications to mitigate known vulnerabilities or to prevent attacks from ever occurring (the ability to perform this sort of "diversity in time" is known as renewability).

Certainly, it would be possible to create diverse instances of applications using white-box cryptography by simply running the steps described above several times, once for each instance. However, this approach, on top of being slow, necessitates that each instance be separately tested, which severely limits the amount of diversity that can be applied. A different approach is to have most of the application remain the same between instances, and to have the diversity be data-driven, meaning the diverse instances can actually be created after the application has already been compiled and linked. Data-based diversity also makes for much simpler renewability, as there is often a channel in place by which data on a client can be updated. This process of generating diverse data for an already built application is referred to as "individualization". Individualization of white-box cryptography data can be accomplished by using export tables and repeatedly running wbdatagen 154 after the application is built. One method of achieving this is to use wbdatagen 154 to associate a distinct fixed-key with each instance of an application. To facilitate this use without the need to change the parameterization file 124 each time wbdatagen 154 is run, the fixed key can also be specified on the command line.

Summary

In the previous sections, the steps needed to integrate white-box cryptographic functionality into an application have been described. These steps can be summarized as follows.

The user adds calls to the white-box cryptography API to their application.

The user creates a white-box parameterization file and adds records for each call.

The user runs wbcodegen, followed by xcode, followed by wbdatagen to generate supporting code and data for a transcoded build.

The user compiles, links and tests their application.

The user repeats steps until they are happy with the size, performance and security.

The user runs wbdatagen repeatedly to create diverse instances of the supporting data.

The above-described embodiments of the present invention are intended to be examples only. The particular embodiments may be altered, modified and varied by those of skill in the art without departing from the scope of the invention, which is defined solely by the claims appended hereto.

What is claimed is:

1. A computer-implemented method of generating a protected software application using white-box cryptography, comprising:

receiving at least one input source file including application source code and abstracted white-box function calls, where each abstracted function call can be instantiated by a developer using a late binding code translation approach to implement a white-box call performing a tamper-resistant function related to protecting the input source file in its application runtime from external vulnerability attackers;

receiving a parameterization file containing cryptographic domain parameters for each abstracted white-box function call; wherein the domain parameters are expressed in each parameterization file as concrete values pertinent to the associated cryptographic domain that are replaced by the late-binding to provide a translated form of the tamper-resistant function instantiated from using the received abstracted white-box function;

generating white-box call definition data defining each abstracted white-box function call in accordance with its cryptographic domain parameters;

applying at least one data transformation to the input source file and the white-box call definition data to respectively generate a transformed source file and transformed white-box call definition data;

generating data initializations containing instance-specific data for each white-box function call in accordance with the white-box call definition data and the transformed white-box call definition data;

compiling the transformed source file, the transformed white-box definition data and the data initialization code, and linking the resulting compiled code to a white-box library to provide an executable software application; and wherein generating the white-box call definition data comprises generating a white-box call definition file and white-box metadata specifying parameters chosen for each white-box function call.

2. The method as claimed in claim 1, wherein applying the at least one data transformation to the transformed white-box call definition data generates a transformed white-box call definition file and transformation metadata specifying data transformations chosen for selected parameters.

3. The method as claimed in claim 2, wherein generating the data initializations comprises generating a data initialization file in accordance with the white-box metadata and the transformation metadata.

4. The method as claimed in claim 1 wherein generating the white-box call definition data comprises: generating at least one white-box call definition file which includes transformation qualifiers understood by a data transformation engine; and generating at least one transformation metadata file describing the cryptographic domain parameters and the transformations chosen.

5. The method as claimed in claim 1, wherein generating the white-box call definition data generates code, in an automated manner, connecting white-box implementation Application Procedural Interfaces (APIs) to the application source code, and code connecting a white-box implementation API to another white-box implementation API when they must communicate.

6. The method as claimed in claim 1, wherein the white-box function calls call at least one chained encryption.

7. The method as claimed in claim 6, wherein the at least one chained encryption is performed as a single operation.

8. The method as claimed in claim 1, further comprising generating diverse instances of the executable software application.

9. The method as claimed in claim 8, wherein generating the diverse instances comprises associating a distinct fixed-key with each instance of the executable software application.

10. The method as claimed in claim 1, wherein the at least one data transformation comprises a block cipher.

11. The method as claimed in claim 1, wherein the at least one data transformation comprises an asymmetric cipher.

12. A computer-implemented method of generating a software application using white-box cryptographic techniques, comprising:

receiving at least one input source file including application source code and abstracted white-box function calls, where each abstracted function call can be instantiated by a developer using a late binding code translation approach to implement a white-box call performing a tamper-resistant function related to protecting the input source file in its application runtime from external vulnerability attackers;

receiving a parameterization file containing cryptographic domain parameters for each abstracted white-box function call; wherein the domain parameters are expressed in each parameterization file as concrete values pertinent to the associated cryptographic domain that are replaced by the late-binding to provide a translated form of the tamper-resistant function instantiated from using the received abstracted white-box function;

generating a white-box call definition file, defining each abstracted white-box function call in accordance with its cryptographic domain parameters, and white-box metadata specifying parameters chosen for each white-box function call;

applying at least one data transformation to the input source file to generate a transformed source file;

applying the at least one data transformation to the white-box call definition file to generate a transformed white-box call definition file and transformation metadata specifying data transformations chosen for selected parameters;

generating a data initialization file containing instance-specific data for each white-box function call in accordance with the white-box metadata and the transformation metadata; and compiling the transformed source file, the transformed white-box definition file and the data initialization file, and linking the resulting compiled code file to a white-box library to provide an executable software application;

wherein generating the white-box call definition data comprises generating a white-box call definition file and white-box metadata specifying parameters chosen for each white-box function call.

13. A non-transitory computer-readable medium storing computer executable instructions which, when executed by a processor, cause said processor to carry out a method of generating a protected software application using white-box cryptography, said method comprising steps of:

receiving at least one input source file including application source code and abstracted white-box function calls, where each abstracted function call can be instantiated by a developer using a late binding code translation approach to implement a white-box call performing a tamper-resistant function related to protecting the input source file in its application runtime from external vulnerability attackers;

receiving a parameterization file containing cryptographic domain parameters for each abstracted white-box function call; wherein the domain parameters are expressed in each parameterization file as concrete values pertinent to the associated cryptographic domain that are replaced by the late-binding to provide a translated form of the tamper-resistant function instantiated from using the received abstracted white-box function;

generating white-box call definition data defining each abstracted white-box function call in accordance with its cryptographic domain parameters;

applying at least one data transformation to the input source file and the white-box call definition data to respectively generate a transformed source file and transformed white-box call definition data; and generating data initializations containing instance-specific data for each white-box function call in accordance with the white-box call definition data and the transformed white-box call definition data;

compiling the transformed source file, the transformed white-box definition data and the data initialization code, and linking the resulting compiled code to a white-box library to provide an executable software application; and wherein generating the white-box call definition data comprises generating a white-box call definition file and white-box metadata specifying parameters chosen for each white-box function call.

14. The non-transitory computer-readable medium as claimed in claim 13, wherein applying the at least one data transformation to the transformed white-box call definition data generates a transformed white-box call definition file and transformation metadata specifying data transformations chosen for selected parameters.

15. The non-transitory computer-readable medium as claimed in claim 14, wherein generating the data initializations comprises generating a data initialization file in accordance with the white-box metadata and the transformation metadata.

16. The non-transitory computer-readable medium as claimed in claim 13, wherein the at least one data transformation comprises at least one of a block cipher or an asymmetric cipher.

* * * * *